US012591116B2

(12) United States Patent
Feng et al.

(10) Patent No.: US 12,591,116 B2
(45) Date of Patent: Mar. 31, 2026

(54) OPTICAL LENS, OPTICAL MODULE, AND ELECTRONIC DEVICE

(71) Applicant: VIVO MOBILE COMMUNICATION CO., LTD., Guangdong (CN)

(72) Inventors: Tao Feng, Hangzhou (CN); Haiyan Wang, Hangzhou (CN); Wei Huang, Hangzhou (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 326 days.

(21) Appl. No.: 18/428,347

(22) Filed: Jan. 31, 2024

(65) Prior Publication Data

US 2024/0176109 A1     May 30, 2024

Related U.S. Application Data

(63) Continuation of application No. PCT/CN2022/110569, filed on Aug. 5, 2022.

(30) Foreign Application Priority Data

Aug. 12, 2021     (CN) .......................... 202110925916.8

(51) Int. Cl.
  *G02B 9/60*          (2006.01)
  *G02B 5/00*          (2006.01)
  *G02B 13/00*         (2006.01)
(52) U.S. Cl.
  CPC ......... *G02B 13/0045* (2013.01); *G02B 5/005* (2013.01); *G02B 9/60* (2013.01)

(58) Field of Classification Search
  CPC ...................... G02B 13/0045; G02B 13/0065; G02B 13/18; G02B 5/005; G02B 9/60
  USPC ......................................................... 359/714
  See application file for complete search history.

(56) References Cited

U.S. PATENT DOCUMENTS

| | | | | |
|---|---|---|---|---|
| 6,859,332 B2 * | 2/2005 | Nagata | ........... | G02B 15/143507 |
| | | | | 359/846 |
| 6,898,023 B2 * | 5/2005 | Takeuchi | ....... | G02B 15/143505 |
| | | | | 359/689 |
| 6,927,920 B2 * | 8/2005 | Nagata | ........... | G02B 15/143507 |
| | | | | 359/689 |
| 6,980,369 B2 * | 12/2005 | Ishikawa | ........ | G02B 15/143507 |
| | | | | 359/689 |
| 7,315,423 B2 * | 1/2008 | Sato | ................ | G02B 15/144113 |
| | | | | 359/687 |
| 7,375,901 B2 * | 5/2008 | Tanaka | ........... | G02B 15/144113 |
| | | | | 359/687 |
| 12,372,750 B2 * | 7/2025 | Li | ........................... | G02B 13/18 |
| 12,517,330 B2 * | 1/2026 | Lee | ................... | G02B 13/0065 |
| 2002/0136150 A1 * | 9/2002 | Mihara | .......... | G02B 15/143507 |
| | | | | 369/125 |

(Continued)

FOREIGN PATENT DOCUMENTS

| | | |
|---|---|---|
| CN | 101140352 A | 3/2008 |
| CN | 109239904 A | 1/2019 |

(Continued)

*Primary Examiner* — William R Alexander
(74) *Attorney, Agent, or Firm* — Price Heneveld LLP

(57)     ABSTRACT

An optical lens, an optical module, and an electronic device are provided. The optical lens includes: a first lens (1), a reflector (2), a diaphragm (3), a second lens (4), a third lens (5), a fourth lens (6), and a fifth lens (7) in sequence from an object side to an image side.

20 Claims, 8 Drawing Sheets

(56)          References Cited

U.S. PATENT DOCUMENTS

| | | | | |
|---|---|---|---|---|
| 2003/0107823 A1* | 6/2003 | Sekiyama | .......... | G02B 13/0065 |
| | | | | 359/292 |
| 2003/0179464 A1* | 9/2003 | Amanai | ......... | G02B 15/144515 |
| | | | | 359/676 |
| 2003/0214726 A1* | 11/2003 | Mihara | .................. | G02B 13/04 |
| | | | | 359/689 |
| 2004/0027684 A1* | 2/2004 | Nishioka | ........ | G02B 15/144515 |
| | | | | 359/676 |
| 2004/0066561 A1* | 4/2004 | Nagata | .......... | G02B 15/143507 |
| | | | | 359/676 |
| 2004/0125463 A1* | 7/2004 | Takeuchi | .......... | G02B 13/0065 |
| | | | | 359/689 |
| 2004/0179273 A1* | 9/2004 | Ishikawa | ........ | G02B 15/143507 |
| | | | | 359/680 |
| 2004/0190154 A1* | 9/2004 | Wakai | .................. | G02B 13/009 |
| | | | | 359/676 |
| 2004/0201901 A1* | 10/2004 | Nagata | .......... | G02B 15/143507 |
| | | | | 359/676 |
| 2004/0240078 A1* | 12/2004 | Sekiyama | ........... | G02B 13/006 |
| | | | | 359/726 |
| 2005/0128604 A1* | 6/2005 | Kuba | ............. | G02B 15/145129 |
| | | | | 359/726 |
| 2006/0215277 A1* | 9/2006 | Sato | ............... | G02B 15/144113 |
| | | | | 359/687 |
| 2006/0274426 A1* | 12/2006 | Sueyoshi | ............. | G02B 13/009 |
| | | | | 359/676 |
| 2007/0070513 A1 | 3/2007 | Yamashita et al. | | |
| 2007/0223109 A1* | 9/2007 | Tanaka | .......... | G02B 15/144113 |
| | | | | 359/692 |
| 2010/0214664 A1* | 8/2010 | Chia | .................... | G02B 13/004 |
| | | | | 359/678 |
| 2011/0044673 A1* | 2/2011 | Kawamura | ........... | G03B 17/00 |
| | | | | 359/676 |
| 2021/0072515 A1* | 3/2021 | Chang | .................... | G02B 17/08 |
| 2021/0333515 A1* | 10/2021 | Li | ...................... | G02B 13/0045 |
| 2021/0333516 A1* | 10/2021 | Li | ...................... | G02B 13/0065 |
| 2021/0405326 A1* | 12/2021 | Chen | .................. | G02B 13/0045 |
| 2023/0384566 A1* | 11/2023 | Lee | ........................ | G02B 13/02 |

FOREIGN PATENT DOCUMENTS

| | | | |
|---|---|---|---|
| CN | 109656004 A | 4/2019 |
| CN | 112147766 A | 12/2020 |
| CN | 112162385 A | 1/2021 |
| CN | 112578535 A | 3/2021 |
| CN | 113608335 A | 11/2021 |

* cited by examiner

Millimeter

Percentage

OPTICAL LENS, OPTICAL MODULE, AND ELECTRONIC DEVICE

CROSS-REFERENCE TO RELATED APPLICATIONS

This application is a Bypass continuation application of PCT International Application No. PCT/CN2022/110569 filed on Aug. 5, 2022, which claims priority to Chinese Patent Application No. 202110925916.8, filed on Aug. 12, 2021 in China, which are incorporated herein by reference in their entireties.

TECHNICAL FIELD

This application relates to the technical field of communication devices, and in particular, to an optical lens, an optical module, and an electronic device.

BACKGROUND

At present, with the continuous development of mobile communication technologies, smart electronic devices such as mobile phones, unmanned aerial vehicles, and tablet computers are developing toward miniaturization and ultra thinness. This enables an overall volume of an optical lens to be continuously compressed. However, if a higher-quality photographing function is to be implemented, excessively compressing a lens volume may reduce image quality of imaging. Therefore, a periscope camera lens emerges, to prevent compression of the lens volume and possibly implement high-definition image photographing effect while ultra-thinness and miniaturization of a terminal product are not changed. Currently, a wide variety of periscope lenses dominate photographing of high-end mobile phones by virtue of length and zooming advantages of the periscope lenses, and are favored by consumers.

Due to a limitation of a thickness of an overall smart electronic device provided with a periscope lens, a caliber of the periscope camera cannot be large, and a light transmission amount is small, causing a problem of poor imaging quality in a dark light condition.

SUMMARY

Embodiments of this application provide an optical lens, an optical module, and an electronic device.

This application is implemented as follows.

According to a first aspect, an embodiment of this application provides an optical lens, in sequence from an object side to an image side, including:

a first lens, a reflector, a diaphragm, a second lens, a third lens, a fourth lens, and a fifth lens.

The first lens has positive refractive power. A surface, facing the object side, of the first lens is a concave surface close to an optical axis, and a surface, facing the image side, of the first lens is a convex surface close to the optical axis.

The second lens has positive refractive power. A surface, facing the object side, of the second lens is a convex surface close to the optical axis.

The reflector is configured to reflect incident light transmitted by the first lens, to enable reflected incident light to be transmitted to the second lens.

The third lens has negative refractive power. A surface, facing the object side, of the third lens is a convex surface close to the optical axis, and a surface, facing the image side, of the third lens is a concave surface close to the optical axis.

The fourth lens has refractive power. A surface, facing the object side, of the fourth lens is a convex surface close to the optical axis, and a surface, facing the image side, of the fourth lens is a concave surface close to the optical axis.

The fifth lens has refractive power.

According to a second aspect, an embodiment of this application further provides an optical module, including the optical lens described in the embodiment in the first aspect.

According to a third aspect, an embodiment of this application further provides an electronic device, including the optical module described in the embodiment in the second aspect.

DESCRIPTION OF EMBODIMENTS

The following clearly describes technical solutions in embodiments of this application with reference to accompanying drawings in embodiments of this application. Apparently, the described embodiments are some but not all of embodiments of this application. All other embodiments obtained by a person of ordinary skill in the art based on embodiments of this application without creative efforts shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, the following describes in detail an optical lens in embodiments of this application based on specific embodiments and application scenarios thereof.

Figure 1:
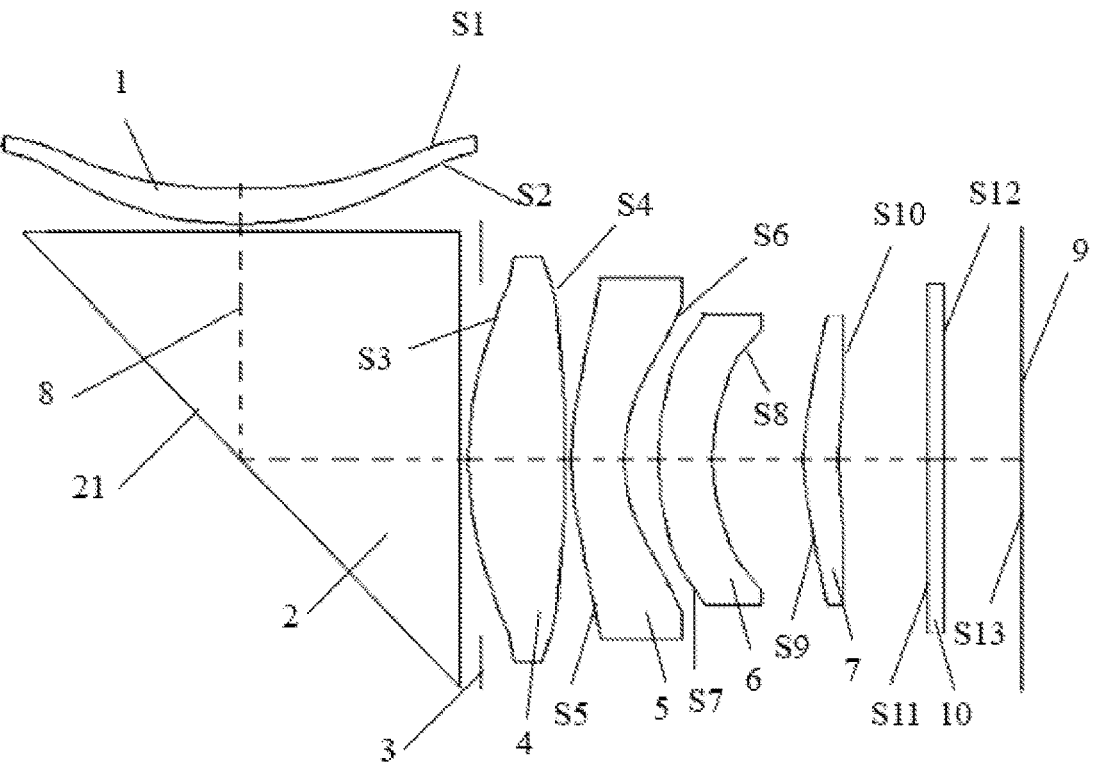
FIG. 1 is a first schematic diagram of a hardware structure of an optical lens according to an embodiment of this application.
Figure 2:
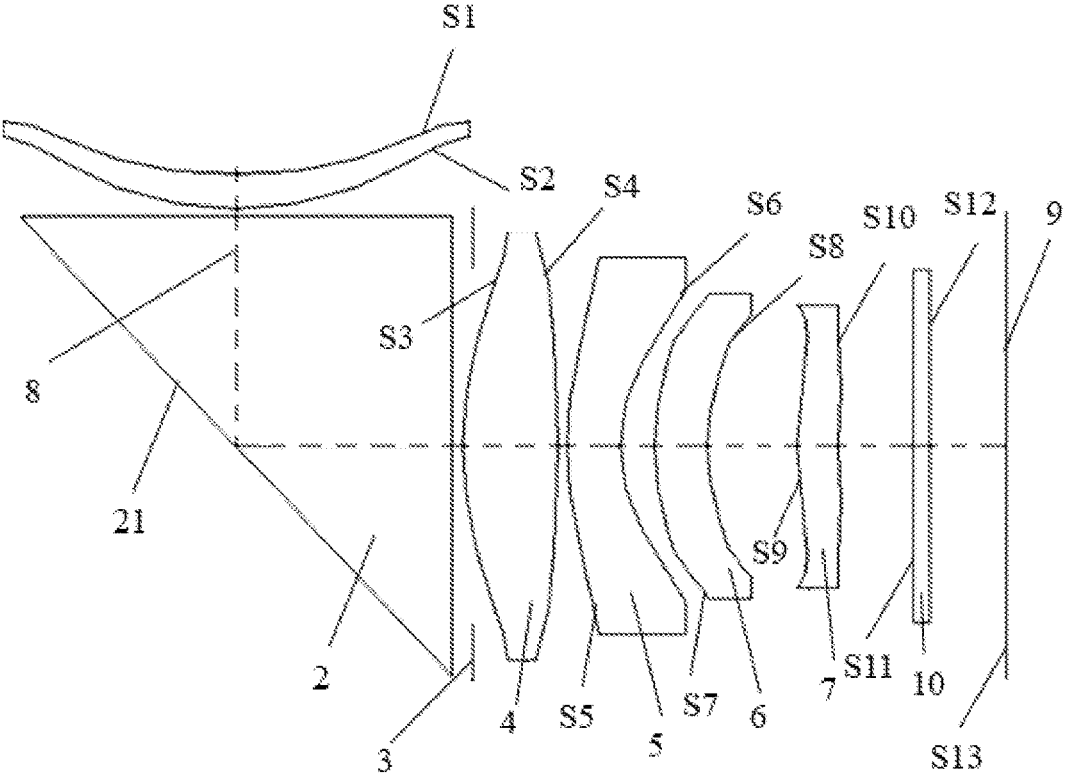
FIG. 2 is a second schematic diagram of a hardware structure of an optical lens according to an embodiment of this application.
Figures 3, 4:
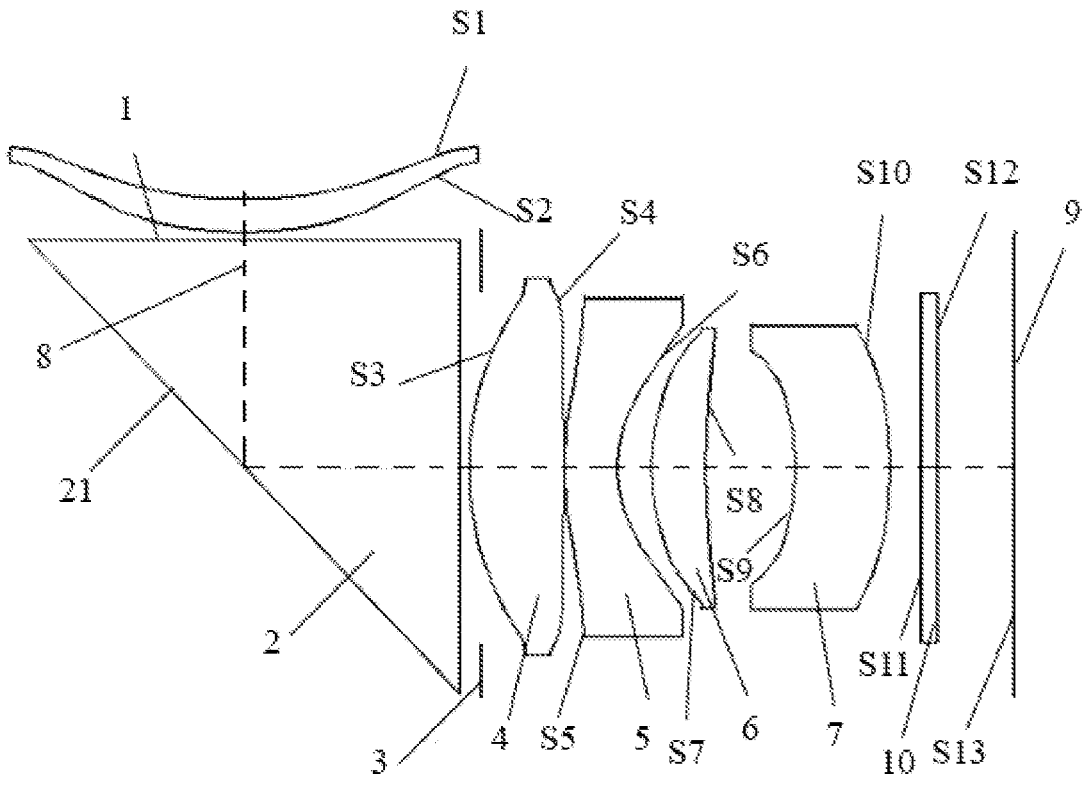
FIG. 3 is a third schematic diagram of a hardware structure of an optical lens according to an embodiment of this application.
FIG. 4 is a first schematic diagram of a vertical axis chromatic aberration curve corresponding to the optical lens shown in FIG. 1.

FIG. 1 to FIG. 3 are schematic diagrams of hardware structures of optical lenses according to embodiments of this application. The optical lens includes: a first lens 1, a reflector 2, a diaphragm 3, a second lens 4, a third lens 5, a fourth lens 6, and a fifth lens 7 in sequence from an object side to an image side.

The first lens 1 has positive refractive power. A surface S1, facing the object side, of the first lens 1 is a concave surface close to an optical axis 8. A surface S2, facing the image side, of the first lens 1 is a convex surface close to the optical axis 8.

It should be noted that the surface S1, facing the object side, of the first lens 1 is the concave surface that is bent in a direction away from the object side and that is close to the optical axis 8, and the surface S2, facing the object side, of the first lens 1 is the convex surface that is bent in a direction close to the image side and that is close to the optical axis 8.

The second lens 4 has positive refractive power. A surface S3, facing the object side, of the second lens 4 is a convex surface close to the optical axis 8.

It should be noted that, the surface S3, facing the object side, of the second lens 4 is the convex surface that is bent in a direction close to the object side and that is close to the optical axis 8, and a surface S4, facing the image side, of the second lens 4 may be a convex surface that is bent in a direction close to the image side and that is close to the optical axis 8, or may be a concave surface that is bent in a direction away from the image side, which is specifically related to refractive power of the fourth lens 6 and the fifth lens 7.

The reflector 2 is configured to reflect incident light transmitted by the first lens 1, to enable reflected incident light to be transmitted to the second lens 4.

Optionally, the reflector 2 is a triangular prism. A cross section of the triangular prism is a right-angle triangle. Specifically, one right angle surface of the triangular prism faces the first lens 1, and the other right angle surface of the triangular prism faces the second lens 4. A reflection surface 21 of the reflector 2, namely, an oblique surface of the triangular prism, is used to reflect incident light transmitted by the first lens 1, to enable reflected incident light to be transmitted to the second lens 4. In other words, the reflector 2 can enable the light transmitted from the first lens 1 to be reflected, and then transmit reflected light to the second lens 4. Therefore, installation space occupied by the optical lens can be effectively reduced while an optical path direction can be changed.

Optionally, the diaphragm 3 is disposed on an edge of the surface S3, facing the object side, of the second lens 4.

The third lens 5 has negative refractive power. A surface S5, facing the object side, of the third lens 5 is a convex surface close to the optical axis 8. A surface S6, facing the image side, of the third lens 5 is a concave surface close to the optical axis 8.

It should be noted that, the surface S5, facing the object side, of the third lens 5 is the convex surface that is bent in a direction close to the object side and that is close to the optical axis 8, and the surface S6, facing the image side, of the third lens 5 is the concave surface that is bent in the direction away from the image side and that is close to the optical axis 8.

The fourth lens 6 has refractive power. A surface S7, facing the object side, of the fourth lens 6 is a convex surface close to the optical axis 8. A surface S8, facing the image side, of the fourth lens 6 is a concave surface close to the optical axis 8.

It should be noted that the surface S7, facing the object side, of the fourth lens 6 is the convex surface that is bent in the direction close to the object side and that is close to the optical axis 8, and the surface S8, facing the image side, of the fourth lens 6 is the concave surface that is bent in the direction away from the image side and that is close to the optical axis 8.

The fifth lens 7 has refractive power.

Herein, the surface, facing the object side, of the lens may be referred to as an object side surface, and the surface, facing the image side, of the lens may be referred to as an image side surface. Specifically, the object side surface of the lens specifically means a surface away from a photosensitive element, and the image side surface of the lens specifically means a surface close to the photosensitive element.

Herein, refractive power of a lens means a focusing capability or a diffusion capability of the lens on light. Specifically, a lens having positive refractive power indicates that the lens can focus incident beams. A lens having negative refractive power indicates that the lens can expand a width of incident light.

Optionally, the optical lens satisfies the following relational expression:

10°<HFOV<20°, where HFOV represents a horizontal field of view angle of the optical lens; and 1.8<F/NO<2.5, where F/NO represents a quantity of apertures of the optical lens.

As shown in FIG. 1 and FIG. 2, in an optional first implementation, the surface S4, facing the image side, of the second lens 4 is the convex surface close to the optical axis 8. The refractive power of the fourth lens 6 is negative refractive power.

The refractive power of the fifth lens 7 is positive refractive power. A surface S9, facing the object side, of the fifth lens 7 is a convex surface close to the optical axis 8. A surface S10, facing the image side, of the fifth lens 7 is a concave surface close to the optical axis 8.

It should be noted that the surface S9, facing the object side, of the fifth lens 7 is the convex surface that is bent in the direction close to the object side and that is close to the optical axis 8, and the surface S10, facing the image side, of the fifth lens 7 is the concave surface that is bent in the direction away from the image side and that is close to the optical axis 8.

As shown in FIG. 3, in an optional second implementation, the surface S4, facing the image side, of the second lens 4 is the concave surface close to the optical axis 8. The refractive power of the fourth lens 6 is positive refractive power.

The refractive power of the fifth lens 7 is negative refractive power. A surface S9, facing the object side, of the fifth lens 7 is a convex surface close to the optical axis 8. A surface S10, facing the image side, of the fifth lens 7 is a convex surface close to the optical axis 8.

It should be noted that the surface S9, facing the object side, of the fifth lens 7 is the convex surface that is bent in the direction close to the object side and that is close to the optical axis 8, and the surface S10, facing the image side, of the fifth lens 7 is the convex surface that is bent in the direction close to the image side and that is close to the optical axis 8.

Optionally, an angle between the reflection surface 21 of the reflector 2 and the optical axis 8 corresponding to the first lens 1 is 45 degrees.

To be specific, the reflection surface 21 of the reflector 2 can enable light transmitted from the first lens 1 to be reflected at 90 degrees and then transmit reflected light to the second lens 4. Therefore, installation space occupied by the optical lens can be effectively reduced while an optical path direction can be changed.

In an optional implementation, a focal length of the first lens 1 satisfies the following relational expression:

0<EFL1<50 mm, where EFL1 represents the focal length of the first lens.

It should be noted that the focal length of the first lens 1 is controlled to be a relatively small positive value, so that the first lens having a relatively large focal power can be obtained. In this way, a light height can be reduced effectively by using the first lens 1, and a light intake can be increased while miniaturization of the optical lens is satisfied.

In an optional implementation, the optical lens satisfies the following relational expression:

DL/EFL≤0.55, where DL represents a length that is in an optical axis direction and that is between the surface S3 facing the object side, of the second lens 4 and the surface S10, facing the image side, of the fifth lens 7, and EFL represents an effective focal length of the optical lens.

Optionally, the first lens 1, the second lens 4, the third lens 5, the fourth lens 6, and the fifth lens 7 are all aspherical lenses.

It should be noted that an aspherical surface formula used in the optical lens in embodiments of this application is defined as follows:

$$ x = \frac{ch^2}{1 + \sqrt{1 - (k+1)c^2h^2}} + \sum Aih^i $$

where x is a sag from a vertex of an aspherical surface when the aspherical surface is at position with a height of h in the optical axis direction; c is a paraxial curvature of the aspherical surface and is a reciprocal of a radius of curvature of the aspherical surface; k is a conic coefficient of the aspherical surface; and Ai is a correction coefficient of an $i^{th}$ order of the aspherical surface.

The following specifically describes, in three embodiments, parameters for specific implementation of the optical lens in embodiments of this application.

Embodiment 1

Refer to the structure of the optical lens in FIG. 1. A refractive index, an Abbe number, and a focal length of the optical lens are all with reference to light having a wavelength of 555.00 nm. Table 1 shows lens data of the optical lens. Table 2 shows high-order coefficients A4, A6, A8, A10, A12, A14, A16, A18, and A20 of aspherical surfaces of the optical lens.

6

TABLE 1

| Sur-face No. | Surface type | Radius of curvature (mm) | Thickness (mm) | Refrac-tive index | Abbe number | Conic coefficient |
|---|---|---|---|---|---|---|
| 0 | Spherical surface | Unlimited | Unlimited | | | Unlimited |
| S1 | Aspheric surface | −13.675 | 0.528 | 1.544 | 56.114 | 2.54 |
| S2 | Aspheric surface | −9.126 | 0.015 | | | 1.78 |
| | | | 3.550 | 1.61 | 38.08 | Unlimited |
| | | | −3.550 | 1.61 | 38.08 | Unlimited |
| | | | 0.571 | | | Unlimited |
| Stop | Spherical surface | Unlimited | −0.561 | | | Unlimited |
| S3 | Aspheric surface | 6.223 | 1.799 | 1.544 | 56.114 | −2.86 |
| S4 | Aspheric surface | −26.640 | 0.104 | | | 46.14 |
| S5 | Aspheric surface | 6.474 | 0.990 | 1.661 | 20.37 | −4.91 |
| S6 | Aspheric surface | 3.337 | 0.650 | | | −0.46 |
| S7 | Aspheric surface | 6.006 | 1.000 | 1.639 | 23.53 | 3.22 |
| S8 | Aspheric surface | 3.203 | 1.422 | | | 0.73 |
| S9 | Aspheric surface | 4.035 | 0.696 | 1.639 | 23.53 | 0 |
| S10 | Aspheric surface | 8.505 | 2.450 | | | −45.70 |
| S11 | Spherical surface | Unlimited | 0.150 | 1.517 | 64.167 | Unlimited |
| S12 | Spherical surface | Unlimited | 4.319 | | | Unlimited |
| S13 | Spherical surface | Unlimited | 0.00 | | | Unlimited |

In the table, TTL is a distance, on the optical axis, from an object side surface of the first lens 1 to an imaging surface of the photosensitive element. Imgh is half a diagonal length of an effective pixel area of the optical lens.

It should be noted that parameters in three rows between a row in which S2 is located and a row in which Stop is located in the table correspondingly represent parameters of the reflector.

Specifically, 3.550 represents a vertical distance from a point in an oblique surface of the reflector to a surface, facing the first lens 1, of the reflector; and −3.550 represents a vertical distance from a point in the oblique surface of the reflector to a surface, facing the second lens 4, of the reflector. 0.571 represents a gap distance between a surface, facing the second lens 4, of the reflector and the diaphragm STO.

In the table, S1 represents the object side surface (a surface facing the object side) of the first lens 1; S2 represents an image side surface (a surface facing the image side) of the first lens 1; S3 represents an object side surface of the second lens 4, and S4 represents an image side surface of the second lens 4; S5 represents an object side surface of the third lens 5, and S6 represents an image side surface of the third lens 5; S7 represents an object side surface of the fourth lens 6, and S8 represents an image side surface of the fourth lens 6; and S9 represents an object side surface of the fifth lens 7, and S10 represents an image side surface of the fifth lens 7.

S11 and S12 represent two opposite surfaces of an optical filter in the optical module including the optical lens. S13 represents an imaging surface of a photosensitive element in the optical module including the optical lens.

TABLE 2

| Surface No. | A4 | A6 | A8 | A10 | A12 |
|---|---|---|---|---|---|
| S1 | −1.264E−03 | 3.196E−05 | 4.500E−06 | −6.203E−08 | 0.000E+00 |
| S2 | 8.916E−04 | 5.810E−05 | 2.784E−06 | 0.000E+00 | 0.000E+00 |
| S3 | 8.674E−04 | 4.496E−04 | 6.155E−04 | −2.632E−04 | 6.401E−05 |
| S4 | −2.796E−02 | 3.173E−02 | −1.943E−02 | 7.497E−03 | −1.947E−03 |
| S5 | −1.404E−02 | 1.996E−02 | −7.966E−03 | −1.356E−03 | 2.417E−03 |
| S6 | 1.901E−02 | −1.354E−02 | 2.216E−02 | −2.723E−02 | 1.849E−02 |
| S7 | 5.230E−03 | 6.188E−03 | 1.058E−02 | −1.138E−02 | 7.355E−03 |
| S8 | −2.426E−02 | 3.048E−03 | 8.650E−04 | −5.351E−04 | 4.962E−04 |
| S9 | −1.403E−02 | −1.818E−05 | −5.870E−04 | 4.245E−04 | −1.378E−04 |
| S10 | 3.663E−03 | 4.061E−03 | 5.890E−04 | 2.176E−04 | −1.588E−04 |

| Surface No. | A14 | A16 | A18 | A20 |
|---|---|---|---|---|
| S1 | 0.000E+00 | 0.000E+00 | 0.000E+00 | 0.000E+00 |
| S2 | 0.000E+00 | 0.000E+00 | 0.000E+00 | 0.000E+00 |
| S3 | −9.685E−06 | 9.250E−07 | −5.407E−08 | 1.752E−09 |
| S4 | 3.538E−04 | −4.579E−05 | 4.219E−06 | −2.712E−07 |
| S5 | −1.055E−03 | 2.638E−04 | −4.309E−05 | 4.774E−06 |
| S6 | −7.663E−03 | 2.070E−03 | −3.746E−04 | 4.528E−05 |
| S7 | −2.944E−03 | 7.687E−04 | −1.357E−04 | 1.665E−05 |
| S8 | 8.608E−04 | 4.898E−04 | 1.266E−04 | −6.396E−06 |
| S9 | 2.502E−05 | −2.536E−06 | 1.608E−07 | −7.855E−09 |
| S10 | 4.635E−05 | −7.500E−06 | 6.703E−07 | −2.582E−08 |

Figure 5:
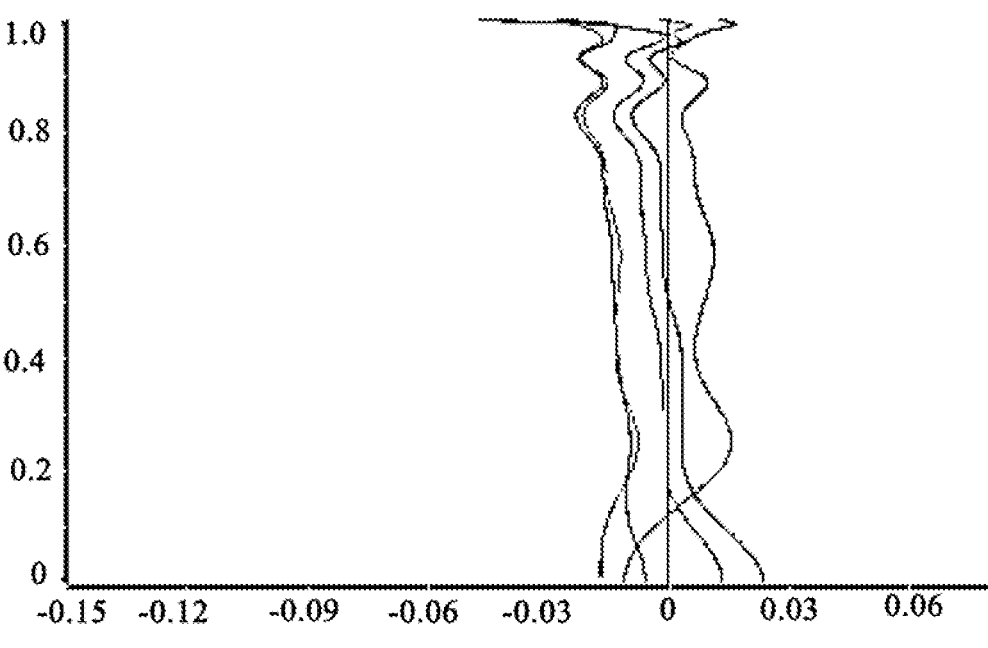
FIG. 5 is a first schematic diagram of an axial chromatic aberration curve corresponding to the optical lens shown in FIG. 1.
Figure 6:
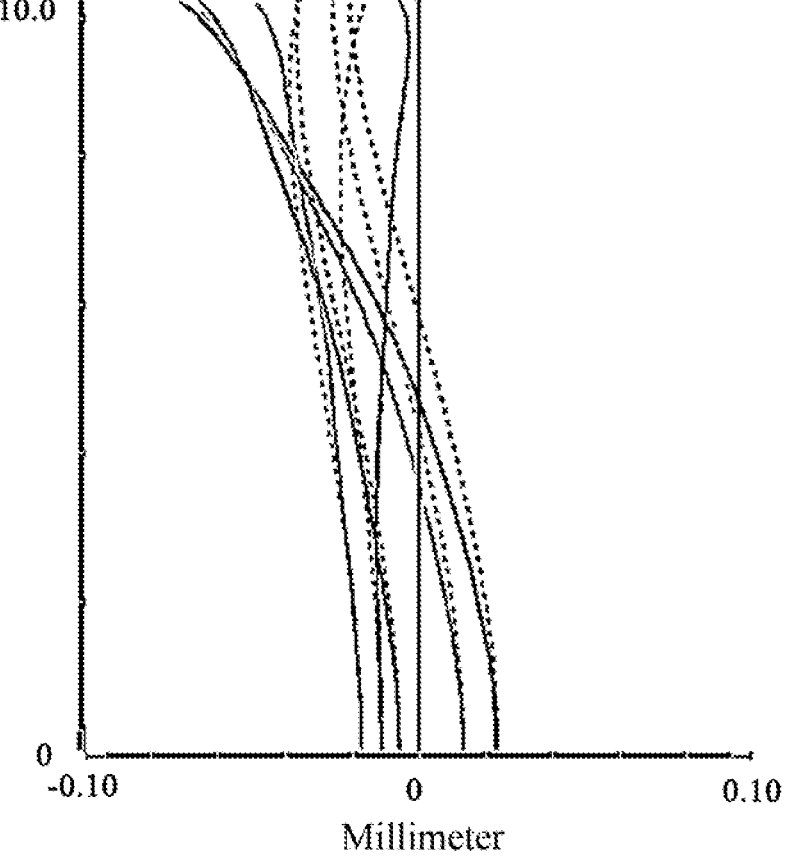
FIG. 6 is a first schematic diagram of an astigmatic curve corresponding to the optical lens shown in FIG. 1.
Figure 7:
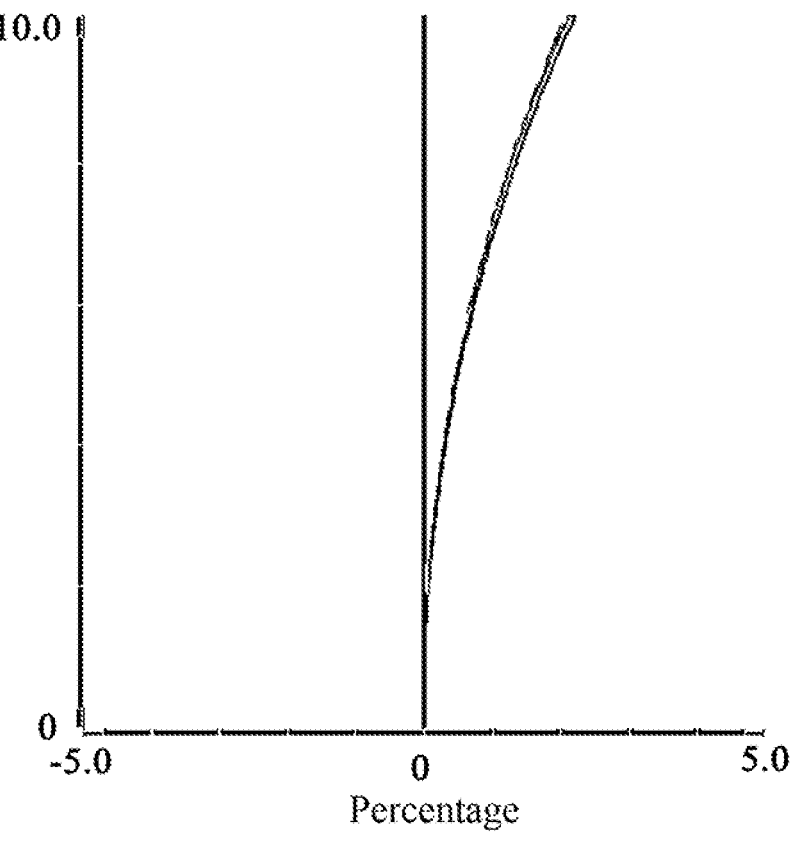
FIG. 7 is a first schematic diagram of a distortion curve corresponding to the optical lens shown in FIG. 1.

An optical lens that has a size range in the foregoing example is corresponding to the following: a schematic diagram (in this diagram, a horizontal coordinate represents a vertical axis chromatic aberration size in unit of microns; and a vertical coordinate represents an actual image height, in unit of millimeters) of a vertical axis chromatic aberration curve shown in FIG. 4, a schematic diagram (in this diagram, a horizontal coordinate represents an axial chromatic aberration size in unit of millimeters; and a vertical coordinate represents a normalized entrance pupil radius, without unit) of an axial chromatic aberration curve shown in FIG. 5, a schematic diagram (in the diagram, a horizontal coordinate represents an astigmatic size in unit of millimeters; and a vertical coordinate represents a field number, without unit) of an astigmatic curve shown in FIG. 6, and a schematic diagram (in the diagram, a horizontal coordinate represents a distortion size without unit, and is represented by a percentage; and a vertical coordinate represents a field number, without unit) of a distortion curve shown in FIG. 7.

The vertical axis chromatic aberration curve represents a deviation between different image heights of light on an imaging surface after passing through an optical lens. The axial chromatic aberration curve represents a deviation that is from a focus at which light of different wavelengths converges after passing through the optical lens. The astigmatic curve represents that a meridian image surface is bent and a sagittal image surface is bent. The distortion curve represents distortion values corresponding to different fields of view.

Embodiment 2

Refer to the structure of the optical lens in FIG. 1. A refractive index, an Abbe number, and a focal length of the optical lens are all with reference to light having a wavelength of 555.00 nm. Table 3 shows lens data of the optical lens. Table 4 shows high-order coefficients A4, A6, A8, A10, A12, A14, A16, A18, and A20 of aspherical surfaces of the optical lens.

TABLE 3

Embodiment 2
EFL = 18.9 mm, F/NO = 2.4, Fov = 10.5°,
TTL = 23.5, Imgh = 2.5, MIC = 5.3

| Surface No. | Surface type | Radius of curvature (mm) | Thickness (mm) | Refractive index | Abbe number | Conic coefficient |
|---|---|---|---|---|---|---|
| 0 | Spherical surface | Unlimited | Unlimited | | | Unlimited |
| S1 | Aspheric surface | −11.184 | 0.624 | 1.544 | 56.114 | 2.51 |
| S2 | Aspheric surface | −7.333 | 0.015 | | | 0.93 |
| | | | 3.650 | 1.61 | 38.08 | |
| | | | −3.650 | 1.61 | 38.08 | |
| | | | 0.803 | | | |
| Stop | Spherical surface | Unlimited | −0.793 | | | Unlimited |
| S3 | Aspheric surface | 4.710 | 1.800 | 1.544 | 56.114 | −2.00 |
| S4 | Aspheric surface | 96.392 | 0.010 | | | −99.00 |
| S5 | Aspheric surface | 7.280 | 1.000 | 1.661 | 20.37 | −6.03 |
| S6 | Aspheric surface | 2.618 | 0.650 | | | −0.57 |
| S7 | Aspheric surface | 4.502 | 1.000 | 1.639 | 23.53 | 2.08 |
| S8 | Aspheric surface | 7.711 | 1.700 | | | 3.16 |
| S9 | Aspheric surface | −7.216 | 1.800 | 1.639 | 23.53 | 0 |
| S10 | Aspheric surface | −8.391 | 1.555 | | | −32.75 |
| S11 | Spherical surface | Unlimited | 0.150 | 1.517 | 64.167 | Unlimited |
| S12 | Spherical surface | Unlimited | 3.424 | | | Unlimited |
| S13 | Spherical surface | Unlimited | 0.00 | | | Unlimited |

For meanings represented by identifier symbols in Table 3, refer to some descriptions in Table 1. The details are not described herein again.

It should be noted that parameters in three rows between a row in which S2 is located and a row in which Stop is located in the table correspondingly represent parameters of the reflector.

Specifically, 3.650 represents a vertical distance from a point in an oblique surface of the reflector to a surface, facing the first lens 1, of the reflector; and −3.650 represents a vertical distance from a point in the oblique surface of the reflector to a surface, facing the second lens 4, of the reflector. 0.803 represents a gap distance between a surface, facing the second lens 4, of the reflector and the diaphragm STO.

TABLE 4

| Surface No. | A4 | A6 | A8 | A10 | A12 | A14 | A16 | A18 | A20 |
|---|---|---|---|---|---|---|---|---|---|
| S1 | −1.777E−03 | 1.705E−05 | 6.513E−06 | −1.007E−07 | 0.000E+00 | 0.000E+00 | 0.000E+00 | 0.000E+00 | 0.000E+00 |
| S2 | −1.281E−03 | 5.763E−05 | 3.364E−06 | 0.000E+00 | 0.000E+00 | 0.000E+00 | 0.000E+00 | 0.000E+00 | 0.000E+00 |
| S3 | −2.232E−01 | −2.569E−02 | −3.136E−02 | 5.533E−03 | 2.317E−03 | 1.106E−03 | 1.993E−04 | 6.143E−04 | 4.967E−04 |
| S4 | −2.796E−02 | 3.173E−02 | −1.943E−02 | 7.497E−03 | −1.947E−03 | 3.538E−04 | 4.579E−05 | 4.219E−06 | −2.712E−07 |
| S5 | −1.392E−01 | −6.454E−02 | 3.319E−02 | −8.126E−04 | 5.085E−03 | −4.116E−04 | 1.861E−04 | −6.111E−04 | 3.050E−04 |
| S6 | −3.410E−02 | −1.078E−01 | 2.775E−02 | −7.470E−03 | 3.752E−03 | −6.480E−05 | −2.901E−04 | 6.743E−05 | −8.143E−05 |
| S7 | −1.259E−02 | −3.771E−02 | −3.231E−03 | −1.220E−02 | −2.524E−03 | 2.282E−03 | 1.569E−03 | 9.179E−04 | −5.118E−04 |
| S8 | −1.928E−01 | 3.895E−02 | 2.740E−04 | −6.110E−03 | −1.978E−03 | −1.224E−03 | −5.737E−04 | 2.148E−04 | −5.516E−05 |
| S9 | −3.861E−01 | 4.383E−03 | 1.485E−03 | −2.161E−04 | −4.775E−05 | −8.416E−05 | −3.302E−05 | 4.697E−06 | 3.150E−06 |
| S10 | −3.136E−01 | 2.249E−02 | −8.279E−04 | 2.968E−04 | 4.430E−06 | −2.097E−05 | −9.926E−06 | 4.532E−06 | 1.832E−06 |

Figure 8:
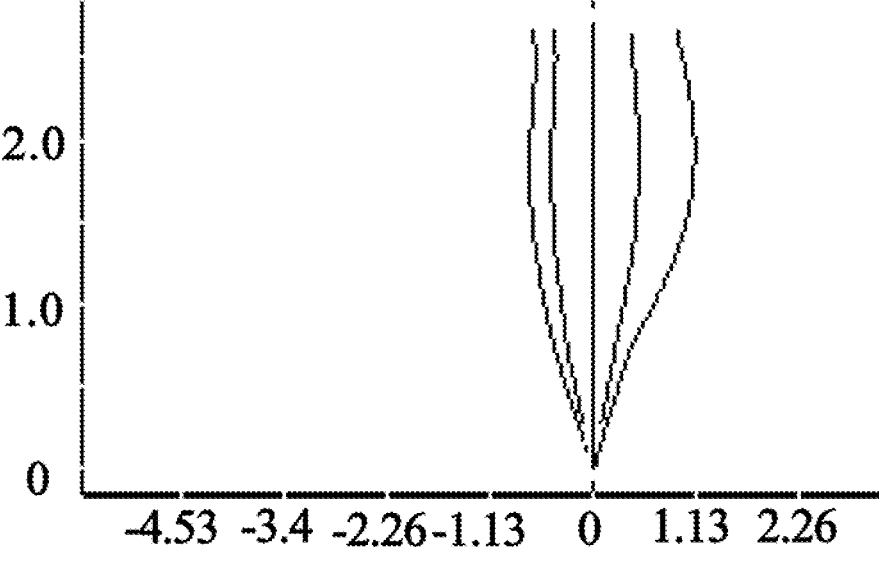
FIG. 8 is a second schematic diagram of a vertical axis chromatic aberration curve corresponding to the optical lens shown in FIG. 2.
Figure 9:
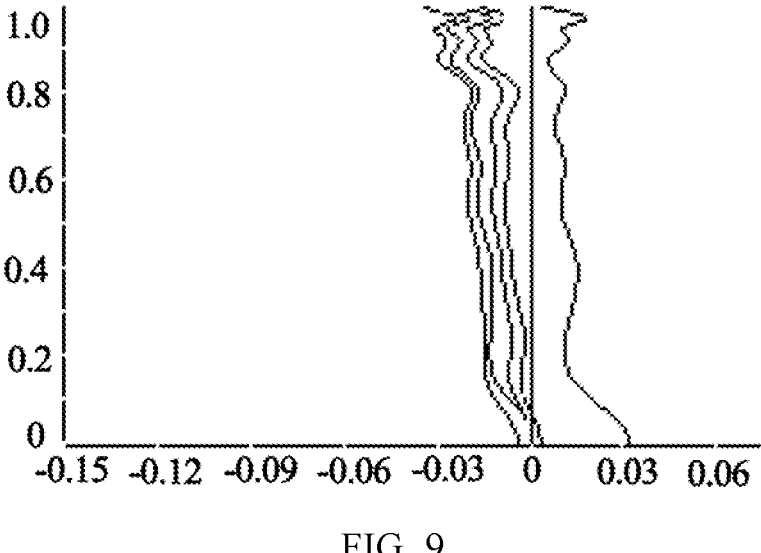
FIG. 9 is a second schematic diagram of an axial chromatic aberration curve corresponding to the optical lens shown in FIG. 2.
Figure 10:
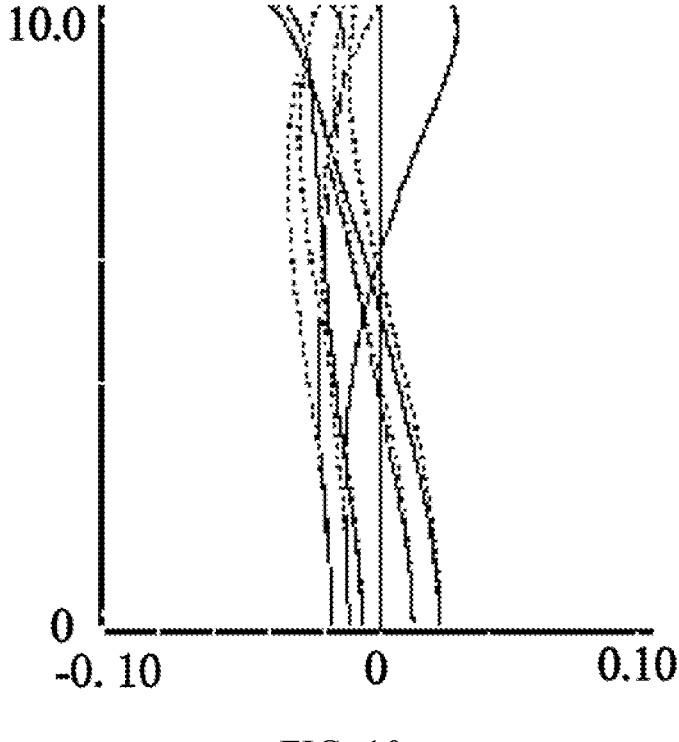
FIG. 10 is a second schematic diagram of an astigmatic curve corresponding to the optical lens shown in FIG. 2.
Figure 11:
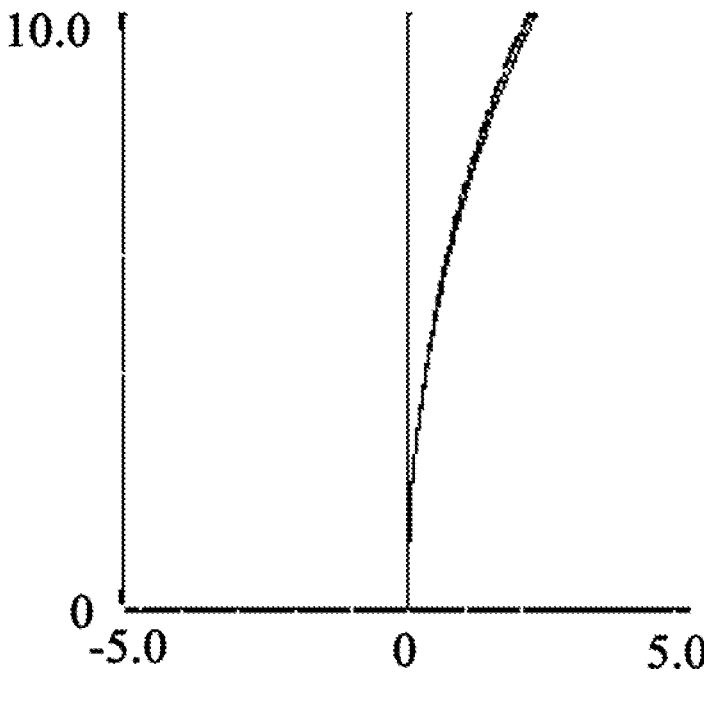
FIG. 11 is a second schematic diagram of a distortion curve corresponding to the optical lens shown in FIG. 2.

An optical lens that has a size range in the foregoing example is corresponding to the following: a schematic diagram (in this diagram, a horizontal coordinate represents a vertical axis chromatic aberration size in unit of microns; and a vertical coordinate represents an actual image height, in unit of millimeters) of a vertical axis chromatic aberration curve shown in FIG. 8, a schematic diagram (in this diagram, a horizontal coordinate represents an axial chromatic aberration size in unit of millimeters; and a vertical coordinate represents a normalized entrance pupil radius, without unit) of an axial chromatic aberration curve shown in FIG. 9, a schematic diagram (in the diagram, a horizontal coordinate represents an astigmatic size in unit of millimeters; and a vertical coordinate represents a field number, without unit) of an astigmatic curve shown in FIG. 10, and a schematic diagram (in the diagram, a horizontal coordinate represents a distortion size without unit, and is represented by a percentage; and a vertical coordinate represents a field number, without unit) of a distortion curve shown in FIG. 11.

Embodiment 3

Refer to the optical structure of FIG. 3. The structure of the optical lens and a refractive index, an Abbe number, and a focal length of the optical lens are all with reference to light having a wavelength of 555.00 nm. Table 5 shows lens data of the optical lens. Table 6 shows high-order coefficients A4, A6, A8, A10, A12, A14, A16, A18, and A20 of aspherical surfaces of the optical lens.

10

TABLE 5

TABLE 5-continued

Embodiment 3
EFL = 14.5 mm, F/NO = 1.9, FOV = 20°,
TTL = 21.5, Imgh = 2.5, MIC = 5.3

| Surface No. | Surface type | Radius of curvature (mm) | Thickness (mm) | Refractive index | Abbe number | Conic coefficient |
|---|---|---|---|---|---|---|
| 0 | Spherical surface | Unlimited | Unlimited | | | Unlimited |
| S1 | Aspheric surface | −11.296 | 0.617 | 1.544 | 56.114 | 2.41 |
| S2 | Aspheric surface | −7.601 | 0.015 | | | 1.03 |
| | | | 3.700 | 1.61 | 38.08 | Unlimited |
| | | | −3.700 | | | Unlimited |
| | | | 0.597 | | | Unlimited |
| Stop | Spherical surface | Unlimited | −0.587 | | | Unlimited |
| S3 | Aspheric surface | 5.794 | 1.800 | 1.544 | 56.114 | −3.75 |
| S4 | Aspheric surface | −111.509 | 0.189 | | | −91.00 |
| S5 | Aspheric surface | 6.593 | 1.000 | 1.661 | 20.37 | −4.18 |
| S6 | Aspheric surface | 3.043 | 0.650 | | | −0.42 |
| S7 | Aspheric surface | 5.111 | 1.000 | 1.639 | 23.53 | 2.27 |
| S8 | Aspheric surface | 3.409 | 1.700 | | | 0.82 |
| S9 | Aspheric surface | 4.652 | 0.778 | 1.639 | 23.53 | 2 |
| S10 | Aspheric surface | 11.619 | 2.222 | | | 9.34 |
| S11 | Spherical surface | Unlimited | 0.150 | 1.517 | 64.167 | Unlimited |
| S12 | Spherical surface | Unlimited | 4.091 | | | Unlimited |
| S13 | Spherical surface | Unlimited | 0.00 | | | Unlimited |

For meanings represented by identifier symbols in Table 5, refer to some descriptions in Table 1. The details are not described herein again.

It should be noted that parameters in three rows between a row in which S2 is located and a row in which Stop is located in the table correspondingly represent parameters of the reflector.

Specifically, 3.700 represents a vertical distance from a point in an oblique surface of the reflector to a surface, facing the first lens 1, of the reflector; and −3.700 represents a vertical distance from a point in the oblique surface of the reflector to a surface, facing the second lens 4, of the reflector. 0.597 represents a gap distance between a surface, facing the second lens 4, of the reflector and the diaphragm STO.

surface close to the optical axis. The reflector is configured to reflect the incident light transmitted by the first lens, to enable reflected incident light to be transmitted to the second lens. The third lens has the negative refractive power. The surface, facing the object side, of the third lens is the convex surface close to the optical axis. The surface, facing the image side, of the third lens is the concave surface close to the optical axis. The fourth lens has the refractive power. The surface, facing the object side, of the fourth lens is the convex surface close to the optical axis. The surface, facing the image side, of the fourth lens is the concave surface close to the optical axis. The fifth lens has the refractive power. In

TABLE 6

| Surface No. | A4 | A6 | A8 | A10 | A12 | A14 | A16 | A18 | A20 |
|---|---|---|---|---|---|---|---|---|---|
| S1 | −1.498E−03 | 2.111E−05 | 5.706E−06 | −8.728E−08 | 0.000E+00 | 0.000E+00 | 0.000E+00 | 0.000E+00 | 0.000E+00 |
| S2 | −1.144E−03 | 6.066E−05 | 3.014E−06 | 0.000E+00 | 0.000E+00 | 0.000E+00 | 0.000E+00 | 0.000E+00 | 0.000E+00 |
| S3 | −5.133E−02 | 1.406E−03 | −2.436E−02 | −4.544E−03 | −5.011E−04 | 8.308E−04 | 5.084E−04 | 2.760E−04 | 2.153E−05 |
| S4 | −3.218E−01 | 2.836E−02 | −3.450E−02 | 9.422E−03 | −1.576E−03 | 2.997E−03 | −1.178E−03 | 7.575E−04 | −5.970E−04 |
| S5 | −1.235E−01 | 4.720E−02 | 3.873E−02 | 7.804E−03 | 8.825E−04 | −2.985E−04 | −1.350E−03 | 5.501E−04 | −3.807E−04 |
| S6 | −8.455E−03 | −9.668E−02 | 9.670E−03 | 4.779E−03 | 4.517E−03 | 2.189E−05 | −5.101E−04 | 1.231E−04 | −1.546E−04 |
| S7 | 2.462E−02 | 2.232E−02 | −1.870E−02 | −9.444E−03 | 2.195E−03 | −4.367E−04 | −3.590E−04 | 8.900E−05 | −1.342E−04 |
| S8 | −3.110E−01 | 5.590E−02 | −5.616E−03 | −4.267E−03 | −7.941E−04 | −5.341E−04 | −1.857E−04 | −8.308E−05 | −5.438E−05 |
| S9 | −5.314E−01 | −1.221E−02 | 7.297E−04 | −1.864E−03 | −8.967E−04 | −7.285E−04 | −3.694E−04 | −1.097E−04 | −1.795E−05 |
| S10 | −5.313E−01 | −2.713E−02 | −1.578E−03 | −3.633E−03 | −1.409E−03 | −7.947E−04 | −1.936E−04 | 2.248E−05 | 1.984E−05 |

Figure 12:
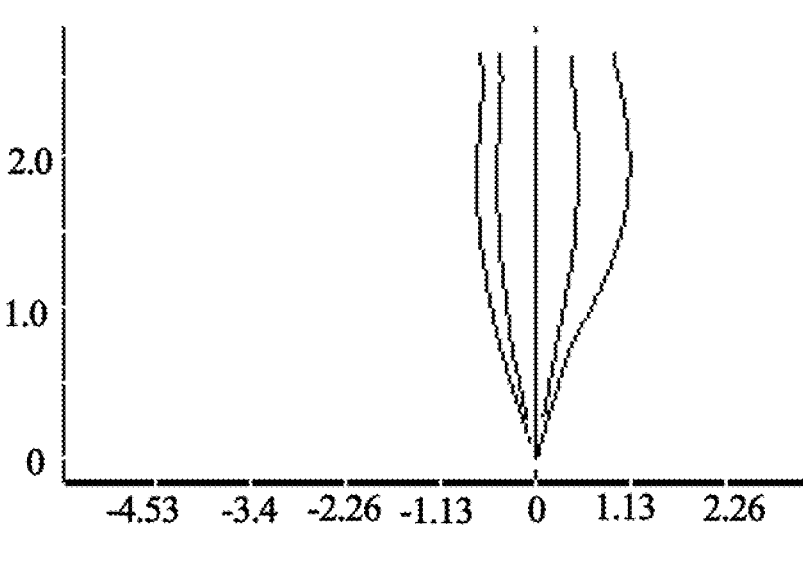
FIG. 12 is a third schematic diagram of a vertical axis chromatic aberration curve corresponding to the optical lens shown in FIG. 3.
Figure 13:
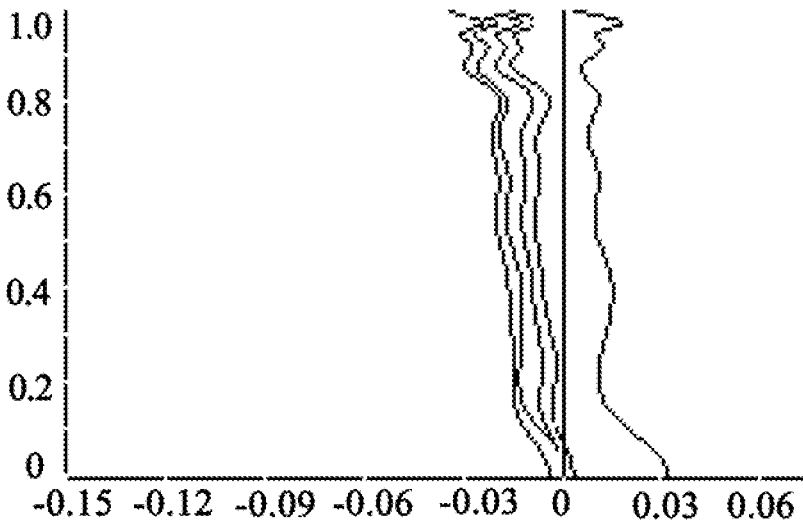
FIG. 13 is a third schematic diagram of an axial chromatic aberration curve corresponding to the optical lens shown in FIG. 3.
Figure 14:
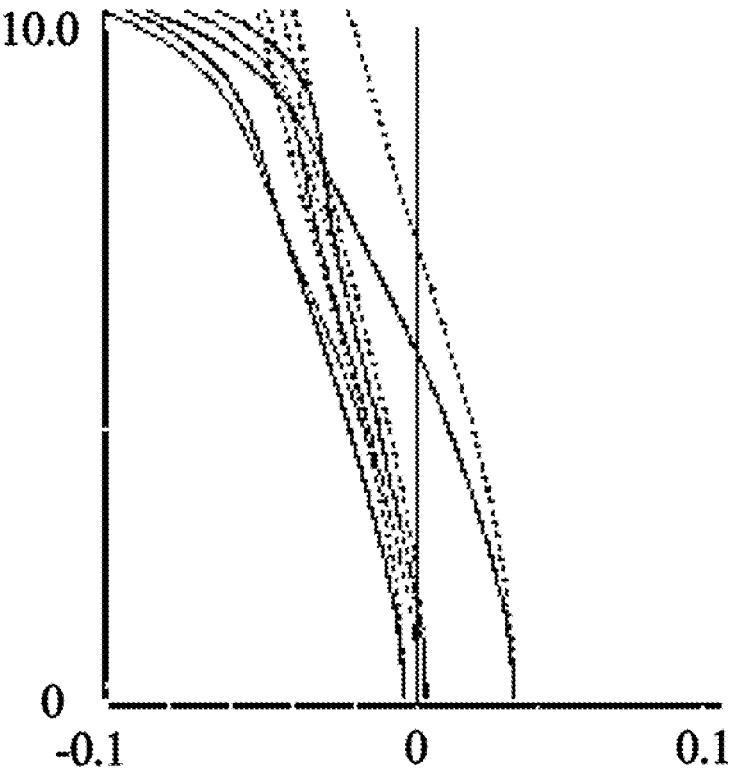
FIG. 14 is a third schematic diagram of an astigmatic curve corresponding to the optical lens shown in FIG. 3.
Figure 15:
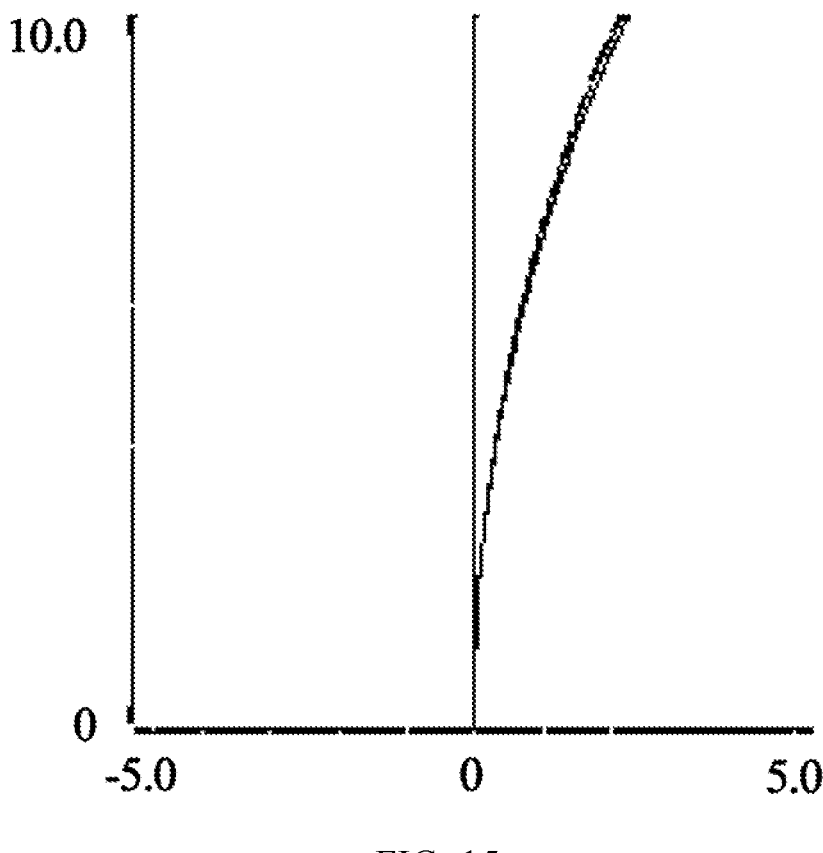
FIG. 15 is a third schematic diagram of a distortion curve corresponding to the optical lens shown in FIG. 3.

An optical lens that has a size range in the foregoing example is corresponding to the following: a schematic diagram (in this diagram, a horizontal coordinate represents a vertical axis chromatic aberration size in unit of microns; and a vertical coordinate represents an actual image height, in unit of millimeters) of a vertical axis chromatic aberration curve shown in FIG. 12, a schematic diagram (in this diagram, a horizontal coordinate represents an axial chromatic aberration size in unit of millimeters; and a vertical coordinate represents a normalized entrance pupil radius, without unit) of an axial chromatic aberration curve shown in FIG. 13, a schematic diagram (in the diagram, a horizontal coordinate represents an astigmatic size in unit of millimeters; and a vertical coordinate represents a field number, without unit) of an astigmatic curve shown in FIG. 14, and a schematic diagram (in the diagram, a horizontal coordinate represents a distortion size without unit, and is represented by a percentage; and a vertical coordinate represents a field number, without unit) of a distortion curve shown in FIG. 15. Focal power, materials, surface types, and central thicknesses of lenses, axial spacings between lenses, and the like are properly allocated, to enable the imaging lens to have at least one type of beneficial effect such as a long focal length, a large aperture, high imaging quality, and easy processing.

It should be noted that a value range of an equivalent focal length of the optical lens in embodiments of this application is 125 mm-250 mm. To be specific, the value range is equivalent to five times a focal length section to ten times the focal length section.

In embodiments of this application, the optical lens includes: the first lens, the reflector, the diaphragm, the second lens, the third lens, the fourth lens, and the fifth lens in sequence from the object side to the image side. The first lens has the positive refractive power. The surface, facing the object side, of the first lens is the concave surface close to the optical axis. The surface, facing the image side, of the first lens is the convex surface close to the optical axis. The second lens has the positive refractive power. The surface, facing the object side, of the second lens is the convex this way, the optical lens provided with the foregoing structure can increase the light intake while increasing the focal length of the optical lens. When the optical lens is used in an electronic device, remote photographing and imaging requirements in a dark light condition can be satisfied.

An embodiment of this application further provides an optical module, including the optical lens described in the foregoing embodiments.

Optionally, as shown in FIG. 1 to FIG. 3, the optical module in this embodiment of this application further includes:

a photosensitive element 9; and
an optical filter 10 disposed between a fifth lens 7 of the optical lens and the photosensitive element 9.

Two opposite surfaces of the optical filter 10 are respectively represented as S11 and S12. An imaging surface of the photosensitive element 9 is represented as S13.

Optionally, the optical filter 10 is an infrared optical filter.

An embodiment of this application further provides an electronic device, including the optical module as described above.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element.

The embodiments of this application are described above with reference to the accompanying drawings, but this application is not limited to the above specific implementations, and the above specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. An optical lens, in sequence from an object side to an image side, comprising:

a first lens, a reflector, a diaphragm, a second lens, a third lens, a fourth lens, and a fifth lens, wherein the first lens has positive refractive power, a surface, facing the object side, of the first lens is a concave surface close to an optical axis, and a surface, facing the image side, of the first lens is a convex surface close to the optical axis;

the second lens has positive refractive power, and a surface, facing the object side, of the second lens is a convex surface close to the optical axis;

the reflector is configured to reflect incident light transmitted by the first lens, to enable reflected incident light to be transmitted to the second lens;

the third lens has negative refractive power, a surface, facing the object side, of the third lens is a convex surface close to the optical axis, and a surface, facing the image side, of the third lens is a concave surface close to the optical axis;

the fourth lens has refractive power, a surface, facing the object side, of the fourth lens is a convex surface close to the optical axis, and a surface, facing the image side, of the fourth lens is a concave surface close to the optical axis; and the fifth lens has refractive power.

2. The optical lens according to claim 1, wherein the optical lens satisfies the following relational expression:

10°<HFOV<20°, wherein HFOV represents a horizontal field of view angle of the optical lens; and 1.8<F/NO<2.5, wherein F/NO represents a quantity of apertures of the optical lens.

3. The optical lens according to claim 1, wherein a surface, facing the image side, of the second lens is a convex surface close to the optical axis; and the refractive power of the fourth lens is negative refractive power; and the refractive power of the fifth lens is positive refractive power, a surface, facing the object side, of the fifth lens is a convex surface close to the optical axis, and a surface, facing the image side, of the fifth lens is a concave surface close to the optical axis.

4. The optical lens according to claim 1, wherein a surface, facing the image side, of the second lens is a concave surface close to the optical axis, and the refractive power of the fourth lens is positive refractive power; and the refractive power of the fifth lens is negative refractive power, a surface, facing the object side, of the fifth lens is a convex surface close to the optical axis, and a surface, facing the image side, of the fifth lens is a convex surface close to the optical axis.

5. The optical lens according to claim 1, wherein an angle between a reflection surface of the reflector and the optical axis corresponding to the first lens is 45 degrees.

6. The optical lens according to claim 1, wherein a focal length of the first lens satisfies the following relational expression:

0<EFL1<50 mm, wherein EFL1 represents the focal length of the first lens.

7. The optical lens according to claim 1, wherein the optical lens satisfies the following relational expression:

DL/EFL≤0.55, wherein DL represents a length that is in an optical axis direction and that is between the surface, facing the object side, of the second lens and a surface, facing the image side, of the fifth lens, and EFL represents an effective focal length of the optical lens.

8. The optical lens according to claim 1, wherein the first lens, the second lens, the third lens, the fourth lens, and the fifth lens are aspherical lenses.

9. An optical module, comprising an optical lens, the optical lens, in sequence from an object side to an image side, comprising:

a first lens, a reflector, a diaphragm, a second lens, a third lens, a fourth lens, and a fifth lens, wherein the first lens has positive refractive power, a surface, facing the object side, of the first lens is a concave surface close to an optical axis, and a surface, facing the image side, of the first lens is a convex surface close to the optical axis;

the second lens has positive refractive power, and a surface, facing the object side, of the second lens is a convex surface close to the optical axis;

the reflector is configured to reflect incident light transmitted by the first lens, to enable reflected incident light to be transmitted to the second lens;

the third lens has negative refractive power, a surface, facing the object side, of the third lens is a convex surface close to the optical axis, and a surface, facing the image side, of the third lens is a concave surface close to the optical axis;

the fourth lens has refractive power, a surface, facing the object side, of the fourth lens is a convex surface close to the optical axis, and a surface, facing the image side, of the fourth lens is a concave surface close to the optical axis; and the fifth lens has refractive power.

10. The optical module according to claim 9, wherein the optical lens satisfies the following relational expression:

10°<HFOV<20°, wherein HFOV represents a horizontal field of view angle of the optical lens; and 1.8<F/NO<2.5, wherein F/NO represents a quantity of apertures of the optical lens.

11. The optical module according to claim 9, wherein a surface, facing the image side, of the second lens is a convex surface close to the optical axis; and the refractive power of the fourth lens is negative refractive power; and the refractive power of the fifth lens is positive refractive power, a surface, facing the object side, of the fifth lens is a convex surface close to the optical axis, and a surface, facing the image side, of the fifth lens is a concave surface close to the optical axis.

12. The optical module according to claim 9, wherein a surface, facing the image side, of the second lens is a concave surface close to the optical axis, and the refractive power of the fourth lens is positive refractive power; and the refractive power of the fifth lens is negative refractive power, a surface, facing the object side, of the fifth lens is a convex surface close to the optical axis, and a surface, facing the image side, of the fifth lens is a convex surface close to the optical axis.

13. The optical module according to claim 9, wherein an angle between a reflection surface of the reflector and the optical axis corresponding to the first lens is 45 degrees.

14. The optical module according to claim 9, wherein a focal length of the first lens satisfies the following relational expression:

0<EFL1<50 mm, wherein EFL1 represents the focal length of the first lens.

15. The optical module according to claim 9, wherein the optical lens satisfies the following relational expression:

DL/EFL≤0.55, wherein DL represents a length that is in an optical axis direction and that is between the surface, facing the object side, of the second lens and a surface, facing the image side, of the fifth lens, and EFL represents an effective focal length of the optical lens.

16. The optical module according to claim 9, wherein the first lens, the second lens, the third lens, the fourth lens, and the fifth lens are aspherical lenses.

17. The optical module according to claim 9, further comprising:

a photosensitive element; and an optical filter disposed between a fifth lens of the optical lens and the photosensitive element.

18. The optical module according to claim 17, wherein the optical filter is an infrared optical filter.

19. An electronic device, comprising an optical module, wherein the optical module comprises an optical lens, the optical lens, in sequence from an object side to an image side, comprising:

a first lens, a reflector, a diaphragm, a second lens, a third lens, a fourth lens, and a fifth lens, wherein the first lens has positive refractive power, a surface, facing the object side, of the first lens is a concave surface close to an optical axis, and a surface, facing the image side, of the first lens is a convex surface close to the optical axis;

the second lens has positive refractive power, and a surface, facing the object side, of the second lens is a convex surface close to the optical axis;

the reflector is configured to reflect incident light transmitted by the first lens, to enable reflected incident light to be transmitted to the second lens;

the third lens has negative refractive power, a surface, facing the object side, of the third lens is a convex surface close to the optical axis, and a surface, facing the image side, of the third lens is a concave surface close to the optical axis;

the fourth lens has refractive power, a surface, facing the object side, of the fourth lens is a convex surface close to the optical axis, and a surface, facing the image side, of the fourth lens is a concave surface close to the optical axis; and the fifth lens has refractive power.

20. The electronic device according to claim 19, further comprising:

a photosensitive element; and an optical filter disposed between a fifth lens of the optical lens and the photosensitive element.

\* \* \* \* \*